Patented July 10, 1951

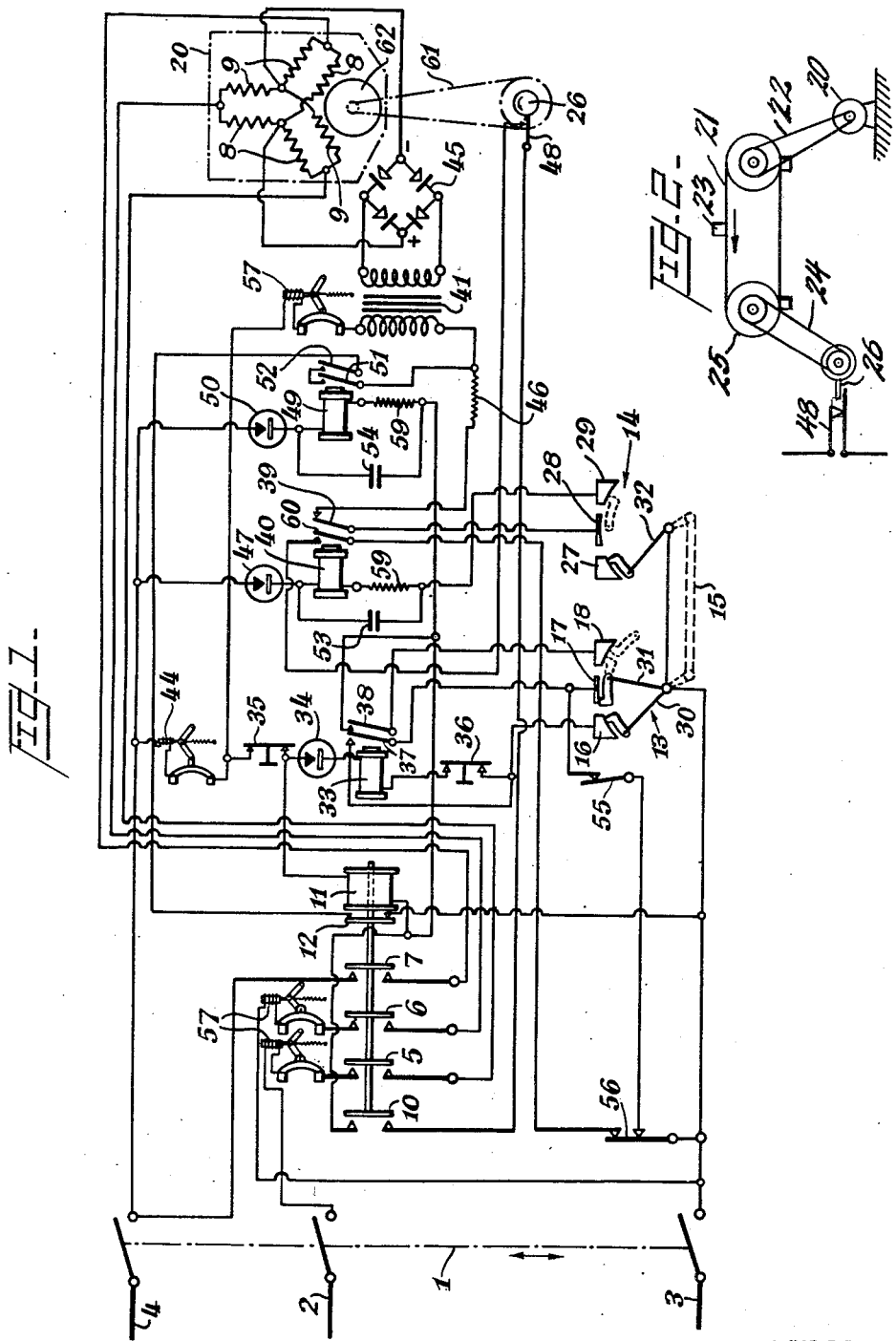

2,560,288

UNITED STATES PATENT OFFICE 2,560,288

DYNAMIC BRAKING FOR ELECTRICALLY DRIVEN MACHINES

Valentine Pearce Harvey and Gordon Francis Wellington Powell, London, England, assignors to Molins Machine Company Limited, London, England, a British company Application May 18, 1948, Serial No. 27,686
In Great Britain May 27, 1947

3 Claims. (Cl. 318—369)

This invention concerns improvements in or relating to dynamic braking of electrically driven machines (e. g. automatic machines) and in particular arrangements embodying means whereby a machine may be stopped with the parts substantially in a predetermined position.

The invention is applicable to machines comprising conveyor systems and particularly to conveyor systems where a series of articles are moved in spaced relationship with each other by a conveyor, an example of such a system being a continuous conveyor such as is commonly used on automatic packing machines. In, for example, the automatic packing of cigarettes, packets containing cigarettes are moved along a bed by an endless conveyor having pusher pieces mounted thereon at equally spaced intervals, and at some position along the conveyor path there are provided heating devices for drying the adhesive on the packets. It will be appreciated that if a conveyor of this kind is stopped when a packet is lying in contact with the heaters, the contents of the packet may be spoilt by exposure to prolonged heat, particularly as it is now the practice to use heating elements of great heat intensity. The present invention provides means whereby such a conveyor can be stopped so that the packet does not lie in such a position.

Again in such machines, finished packets are often moved into a heated box having movable walls and if the machine is stopped with the hot walls in contact with the packets the packets will be spoilt. The present invention provides means to ensure that the machine will stop with the walls of the heated box away from the packets. Numerous other examples might be cited of conditions where it is desirable that machines should be stopped with the moving parts thereof substantially in a predetermined position; for example, in packing machines of the kind referred to above it might be desirable to ensure that packets do not remain in contact with adhesive applying devices for prolonged periods.

In United States application Serial No. 768,020, Patent No. 2,493,670, dated January 3, 1950, there is described improvements in or relating to dynamic braking of electrically driven machines comprising a machine having an electric motor for driving the machine, and adapted to be stopped by dynamic braking means (e. g. a rotatable member), movable in timed relationship with the driven parts of the machine the parts and circuits being so arranged that said member is adapted to initiate the dynamic braking at a given position reached by said means only after the motor has been disconnected from the supply or a winding of the motor has been disconnected from the supply so that the machine ceases to be electrically driven. In one construction described in said specification the member movable in timed relationship with the machine comprises a rotary switch arranged to make contact once per revolution, though a circuit is not established until the alternating (driving) current supply to the motor has been discontinued since the switch for said supply forms part of said circuit and only when it has moved into the "off" position. As stated in the specific description given in said specification, the rotary switch may comprise a contact segment extending over, for example, 10°, and the parts are so arranged that direct current will be applied for dynamic braking very soon after the time at which said segment engages the fixed contacts of the rotating switch. This enables the apparatus to function satisfactorily under all conditions of weather, temperature, and time of the day, for the stopping of any machine depends on its freedom of movement which again depends on the state of the lubricant and how long the machine has been running before it is necessary to stop it. However, in general the braking torque and the motor-inertia are both sufficiently great for the variations in the frictional retarding torque of the machine in question to have little or no effect in the very short time between the successive passage of the pusher pieces past a given point as the frictional retarding effect is very small compared with the braking torque. It will, however, be appreciated that if the operator happens to initiate stopping just as the member (e. g. the rotary switch) is reaching a position where it cannot start the braking current until it has moved substantially through another revolution, there is time for the motor to slow up (through lack of alternating (driving) current) sufficiently to cause the machine eventually to stop with the parts in an undesired position. The present invention provides rather more precise stopping, as in one embodiment illustrated, the alternating (driving) current supply switch above referred to is actuated to switch off by the rotary switch braking a circuit in timed relationship with the machine. As will be apparent later, this functioning of the rotary switch immediately switches on the direct current for braking, and thus it will be seen that the braking current is switched on while the motor is still running at substantially the same speed so that constant conditions for stopping and braking are provided.

Another embodiment, using a direct current motor, is described in the aforesaid United States application Serial No. 768,020, and similar conditions also arise in that case as the current to the armature and series field is switched off while the shunt field is maintained but the armature is not short-circuited for dynamic braking by the shunt field until the rotary timing switch makes contact and so the motor may lose speed before braking starts.

According to the present invention there is provided in a machine having an electric motor for driving the machine and adapted to be stopped by dynamic braking means (e. g. a rotatable member) movable in timed relationship with the driven parts of the machine said means being adapted to break a circuit whereby the motor driving current ceases so that the machine ceases to be electrically driven, and to close a circuit whereby the motor is dynamically braked.

The said means on breaking a circuit may cause a switch controlling the supply of driving current to the motor to be disengaged, the switch also operating another switch whereby dynamic braking is applied to the motor immediately the first switch finishes its disengaging movement.

The machine may be driven by an alternating current motor having a switch controlling the supply of current thereto and comprise a member moving in timed relationship with the machine for causing the operation of said switch to discontinue the supply of alternating current to the motor and direct current to be applied to the stator winding of the motor as the alternating current ceases, to brake the motor and bring the machine to rest with the moving parts thereof substantially in a predetermined position.

The machine may be driven by a direct current motor having a shunt winding in which case the aforesaid means movable in timed relationship with the machine may be adapted to break a circuit whereby the armature current ceases and to close a circuit to cause the armature to be short-circuited so that the motor is braked as the armature continues to run in the shunt field which is still maintained.

The invention may be applied to a machine comprising a conveyor system conveying articles in spaced relationship with each other so that the conveyor is stopped when an article carried thereby is substantially at a predetermined position from a given point.

Further according to the invention there is provided in a machine having a conveyor system as set forth in the preceding paragraph, an alternating current motor for driving the conveyor, a switch for switching off the supply of alternating current to the motor, a source of direct current and a control switch therefor, and a member moving in timed relationship with the conveyor for causing the operation of the first said switch to discontinue the supply of alternating current to the motor and of the control switch for causing direct current to be applied to a stator winding to brake the motor when the alternating current ceases to bring the system to rest when an article is in said predetermined position.

The machine or conveyor system may be driven by a direct current motor in which case the member which moves in timed relationship with the machine is used to determine the time at which the current supply to the armature ceases and the armature is short-circuited while a magnetic field is maintained in the field magnets of the motor so that the armature is dynamically braked.

For an alternating current motor the circuit may comprise means for applying direct current to the stator when starting so as to reduce the starting torque and provide gentle starting for a machine which might be ill-adapted for full load torque. Means are also provided as specified later for "inching" the machine.

Further according to the present invention there are provided in a machine having an alternating current electric motor for driving the machine dynamic braking arrangements as set forth above characterised in that the member movable in timed relationship with the driven parts of the machine is adapted to break a circuit whereby a switch controlling the supply of alternating current to the motor is disengaged, said switch operating another or second switch whereby direct current for braking is fed to the motor immediately the first said switch finishes its disengaging movement. The time taken for said movement, though exceedingly short, is sufficient for the alternating current to discontinue before the direct current is switched to the motor. The switch for supplying alternating current may comprise a five-bar contactor, three of said bars being adapted to feed three-phase current, the fourth bar constituting a switch in the circuit broken by said member, and the fifth constituting the second switch referred to, the five bars being coupled for simultaneous movement. In any case a type of switch is chosen whose movements on disengaging take place in a substantially constant time.

The member may comprise a rotary or cam-operated timing switch normally closed and opened in timed relationship with the driven parts of the machine.

The contactor coil may receive current from two parallel circuits, one through the timing switch and the other through the starting handle and other controls of the machine whereby on the operation of said handle or controls to stop the machine the contactor does not take effect until the timing switch breaks circuit.

Two ways of carrying the invention into effect will now be described with reference to the accompanying drawings in which:

Figure 1 is a circuit diagram for the control of a three-phase, star-wound induction motor having twin star windings.

Figure 2 is a diagram illustrating the driving of a conveyor by the motor and the method of driving a member in timed relationship with the conveyor.

Figure 3:
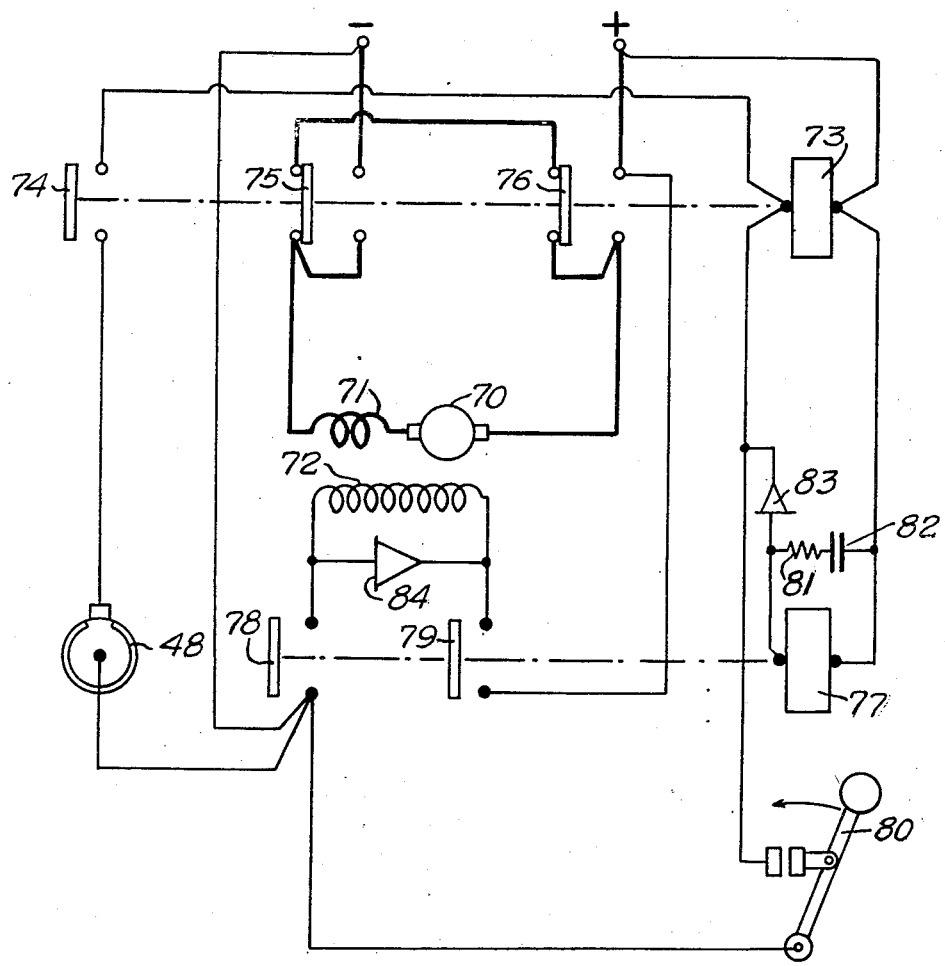
Figure 3 is a diagram illustrating a way of applying the invention to a direct current motor having a shunt winding viz. a compound wound motor.

Referring to Figure 1 of the drawings, three-phase alternating current is supplied through a main switch 1 by the lines 2, 3 and 4 which, when switch arms 5, 6 and 7 are moved over to contact with the terminals of said lines, will feed alternating current to twin stator windings 8 and 9 of a motor 20 which drives a conveyor 21 as shown in Figure 2. The switch arms referred to and another marked 10 form part of a contactor 11, the reference indicating the coil thereof. All the arms 5, 6, 7 and 10 are mechanically coupled for simultaneous movement, and in addition the contactor has another switch arm 12 which is closed when the contactor is not in operation and open when it receives current.

A pair of rotary switches 13 and 14 are provided and mechanically coupled as indicated by a dotted link 15 below them. Each switch has three contact blocks 16, 17 and 18 for 13, and 27, 28 and 29 for 14 and switch 13 has two contact arms 30 and 31 while the switch 14 has a single arm 32. As shown, both switches are in the "off" position.

Direct current is applied for braking to the center points of the twin star windings in the manner described below. For since the center point of each star is at the same A. C. potential, any connection to these points cannot adversely affect the alternating current in the windings.

When the main switch 1 is closed the coil 33 of a relay receives direct (rectified) current from a half-wave rectifier 34 which is connected to the line 4 through a press button 35. This is an emergency stop button and is referred to again. From the relay the connection back to line 3 is through a further press button 36 and via the contact block 16 and arm 30 of the switch 13. The relay therefore pulls over its contact arms 37 and 38 to the other position and closes the contacts.

The link 15 is moved to the left so as to bring the switch contact arm 30 onto the contact block 17 of 13 and the switch contact arm 32 onto the contact block 28 of 14. Thus the current can flow from 3 to which line the three switch arms are connected, through the arm 32 to the block 28 of 14 and through a closed contact arm 39 of a relay 40 (not yet energized) to the primary coil of a transformer 41 the other side of the transformer coil being joined as shown to the line 4 through a principal overload release comprising a thermal trip switch 44. The secondary coil of the transformer is across a full-wave rectifier 45 and from the output terminals of the rectifier lines lead to the center points of the star windings 8 and 9 so that a direct current is set up in said windings. At the same time the movement of link 15 has brought the contact arm 31 onto the block 18 of 13 and thus there is a circuit from line 4 via 44 and 35 to the coil 11 of the contactor and through contact 38 to the block 18 and arm 31 of the switch 13 to the line 3. The contactor switch arms 5, 6, 7 and 10 therefore move over to the left-hand positions and the stator windings 8 and 9 are connected to the lines 2, 3 and 4 and the motor starts, though at a moderate speed (known as "crawling") and with a moderate starting torque, because the direct current from 45 still maintained in the windings has a braking effect on the rotor of the motor. To reduce this braking effect a resistance 46 may be included in the alternating current lead from block 28 of 14 and this resistance may of course be adjustable for the purpose of regulation. The arm 12 moves to break contact simultaneously with the movement of arms 5, 6, 7 and 10.

The continued movement of the link 15 brings the arm 30 of the switch 13 onto the block 18 of 13 and the arm 32 of 14 onto the block 29 of 14, see dotted positions in Figure 1. The latter connection allows direct (rectified) current from a rectifier 47 to pass through the coil 40 of a relay, the alternating supply to the rectifier being from 3 and through 40 to 4. The contact arm 39 is therefore pulled over to break the relay contact and the supply to the transformer is disconnected so that the direct current in the winding 8 and 9 ceases and the motor runs at its full speed. At the same time the contact 60 of the relay is closed and this gives another (parallel) circuit for the contactor 11 via the switch arm 10 and a switch marked 48 (timing switch) and described below.

Meanwhile as soon as the contactor 11 is energized a circuit is made for the coil of another relay 49 from line 4 and direct (rectified) current is supplied to the relay coil by a half-wave rectifier 50. The circuit continues beyond the relay coil via 10 and the switch 48 and the contact arm 60 of 40 to line 3. The arms 51 and 52 of the relay 49 therefore move over and close their contacts, but this has no effect at present since they are in series with the switch arm 12 of the contactor 11, and the contacts of this arm are open since the contactor 11 is energized.

When the machine is to be stopped the link 15 is moved to the right to bring the arms 30, 31 and 32 back to the position shown in Figure 1. During full-speed running the contact arm 39 has been kept in the "off" position by direct (rectified) current from 3 through block 29 of 14 and 40 to 47 and 4 and the arm 39 has to be maintained in the "off" position while link 15 moves back, or otherwise there would be a surge of direct current from 45 which would cause the motor to be braked at once when the machine might stop in any position. The current for energizing the relay 40 during this short time is obtained from a condenser 53 which is charged during running via the rectifier 47 and now discharges through the relay coil. The relay 40 also serves as a safety device, so that if for any reason 48 fails to operate the machine will stop when 60 opens.

Once the contact arm 31 leaves the block 18 of the switch 13 the coil of relay 11 is no longer energized through the contact arm 38 but the parallel circuit through 60 and 48 is still maintained, so the arms 5, 6, 7 and 10 cannot move back to the position shown in Figure 1 and the alternating current to the motor is still maintained.

The switch 48 is a timing switch which is driven in synchronism with the machine, as explained later with reference to Figure 2. The timing switch 48 which as aforesaid is mechanically coupled to the conveyor, constitutes the "member moving in timed relationship with the conveyor." The switch 48 is closed during the greater part of its revolution and opens for a short time when a part of the machine is in a predetermined position. At the instant it opens it breaks the remaining circuit of 11 and the switch arms 5, 6, 7 and 10 move back and the alternating current supply to the windings 8 and 9 is disconnected. As soon as the movement of 5, 6, 7 and 10 is complete the switch 12 is closed. The relay 49 which is in parallel with 11 is also provided with a condenser 54 and this maintains the relay current when the supply through 10 ceases as the contactor 11 breaks circuit. There is therefore a circuit to the transformer so that it can cause the supply of direct current to the windings 8 and 9 the circuit being from 3 via 12—52—51 and the primary coil of the transformer through 44 to 4. Thus the alternating current supply ceases while the motor is going at its full speed and an instant later (when 12 closes) the braking current is applied, and in this way the braking is always performed under constant conditions.

While the link 15 is so manipulated as to keep the arm 32 from moving onto the block 29 of 14, the machine may be "inched" by rocking the arm 31 from block 17 to block 18 and back again. Each clockwise movement of the arm to this extent will start the machine, under the check of the direct current from 45, and each anti-clockwise movement will stop the machine.

Referring now to Figure 2, the motor 20 is shown positively geared to the conveyor 21, for example by a chain 22, though in practice toothed gearing is employed. The conveyor has three pusher pieces 23 on it, and it is desired that the machine shall always stop with the pusher pieces substantially in the position shown. For this purpose the motor is controlled as described with reference to Figure 1 and the timing switch 48 is opened by a cam 26 driven by equal ratio gearing such as a chain 24, since the pitch circle circumference of the conveyor sprocket wheels 25 is equal to the pitch of the pusher pieces, and thus one pusher piece passes a fixed point for each revolution of a conveyor sprocket wheel. In Figure 1, the coupling between the motor 20 and the cam 26 is shown diagrammatically, a chain 61 from the rotor 62 of the motor driving the cam.

Automatic machines, for example packing machines, are frequently provided with detectors which cause the machine to stop if the supply of workpieces fails or for similar reasons. In Figure 1 there is shown one such detector marked 55 and a similar device 56 which operates when a mechanical clutch breaks under an overload.

In the case of the detector marked 55 it will be seen that if the switch contacts are not in engagement the circuit through 33 will be broken provided the machine is running. The relay contacts 37 and 38 therefore open and one circuit through the contactor coil 11 ceases, so as soon as the switch 48 opens, the contactor is de-energized and the current supply to the motor ceases and braking current is applied all as above described. The clutch detector not only breaks the circuit through 33 but is also in series with 48 so the contactor 11 is instantaneously disengaged and the motor is braked and stopped as before. Thus even if 48 does not open because the braking of the clutch may stop the drive to 48, the machine is stopped.

It will be seen from Figure 1 that there is a line from the pivot of 37 to the block 17, so that as long as this block is connected to the arm 30 or 31 the detectors 56 and 55 are short-circuited and the machine can "crawl" irrespective of the action of these detectors and the re-engagement of the clutch is made easy.

As the motor is geared to the machine a number of safety devices are incorporated in the circuit. The principal overload release contact 44 breaks under abnormal currents and when "crawling" is continued for an excessive time, and stops current in the coil 11 of the contactor. The arms 5 and 6 are each joined to the leads 2 and 3 by a thermal release 57 which breaks the circuit if abnormal motor currents occur and isolates the transformer and rectifier and motor. A similar thermal-release 57 is included in the primary circuit of the transformer to protect it against the heavy currents due to excessive "crawling." Each coil relay 40 and 49 has a resistance 59 in series with it, because these relays (a commercial product) have not sufficient resistance for the high voltages involved.

The press-buttons 35 and 36 may be regarded as typical of several placed at different positions about the machine. Pressing 35 causes instantaneous stopping while 36 causes the machine to stop with the parts in the desired position. Operation of any button breaks the circuit of the coil of 11 either directly or through the relay 33 and also breaks the circuit through 33.

In the normal operation of the machine the link 15 is moved backward rapidly, for stopping, and crawling and inching are only done from rest. Thus all intentional stops bring the machine to rest with the parts in the desired position. Stopping by the operation of 56, 44, or the press button 35 represents abnormal stops, and it is not then material where the machine stops, since these stops call for immediate attention and investigation on the part of the operator.

For the safety of the operators the guards used on a machine are coupled to the circuit, so that a machine cannot be driven if a guard is displaced, and the button 35 may be regarded as the equivalent of a guard interposed in the circuit. Any of these abnormal stops, including those due to the displacements of guards, require that the link 10 shall be first moved to its initial or stop position before the machine can be restarted.

Referring to Figure 3, the machine is in this case driven by a compound wound direct current motor comprising armature 70, series field 71 and shunt field 72. The motor is of a kind suitable for starting direct across the line. Timing switch 48 is driven in timed relationship with the machine and is arranged to open the circuit between the two connecting wires to the switch once per cycle of the machine at a predetermined instant and for a period sufficient for the opening of the contacts of a controlling contactor 73 to take place.

The contactor 73 comprises an operating magnet coil bearing the reference 73 with three contact bars 74, 75, 76 so arranged that these bars move to the right in the drawing to make contact with their respective right hand contacts when the coil is energized.

Similarly 77 is a contactor with a magnet coil bearing the reference 77 with contact bars 78 and 79 which move to the right in the drawing and close their associated contacts when the coil is energized.

80 is a machine control lever, arranged to close its associated contacts when the machine is to run and to open them when the machine is to stop.

The operation of the circuit is as follows: With the main terminals + and − connected to the main supply the control lever 80 is moved in the direction of the arrow to start the motor. Its contacts close and provide a circuit to the contactor magnet coil 73. Switch contact bars 74, 75 and 76 therefore move to the right and a direct circuit through the series winding 71 and motor armature 70 is provided.

At the same time the circuit comprising magnet coil 77 with a resistance 81 and a capacitor 82 in parallel thereto is energized through a half-wave rectifier 83 and switch contacts 78 and 79 move across to the right and complete the circuit to the motor shunt field; the motor now speeds up and drives the machine.

It will be seen that due to the closing of contacts 74 there is now another circuit to the contactor magnet coil 73 in addition to that through the contacts of the control lever 80. This additional circuit is through 74 and the timing switch 48. Therefore, whenever the control lever is moved to the off position the circuit to the contactor coils is maintained until the timing switch 48 breaks the circuit between the brush and the segment of the switch. Thus if the control lever 75 is moved to the off position, then the next time the timing switch 48 opens the circuit to the magnet coil 73 is broken and switch bars 74, 75 and 76 move rapidly back to their original positions. Then, as will be seen from the drawing, the armature 70 in series with the series field 71 is short circuited. The magnet coil 77 is, however, still energized from the stored energy in capacitor 82, this energy being prevented from reaching magnet coil 73 by the half-wave rectifier 83 and so the shunt field winding 72 is still energized and the short-circuited armature revolving in this intense field causes a heavy current to flow which gives rapid and effective dynamic braking.

Owing to the effectiveness and consistency of the braking thus obtained and because it is always initiated at the same point in the machine cycle, the machine always comes to rest in substantially the same position.

After a period determined by the size of capacitor 82 there is insufficient energy to maintain the magnet coil 77 energized and contact bars 78 and 79 open, thus disconnecting the shunt field winding from the main supply. The rectifier 84 is used to limit the self-induced voltage of the shunt field winding at the time of the opening of contacts 78 and 79.

The circuit shown is reduced to its simplest form and is suitable for low voltage operation. For high voltages such as are usually used on main supplies it is only necessary to include suitable arc suppression devices such as magnetic blow-outs at 75 and 76 and capacitors across low current contacts such as those of 80, all such devices being common practice in the art.

What we claim as our invention and desire to secure by Letters Patent is:

1. In a motor control system, the combination with an alternating current motor for driving a machine, said motor having stator windings, of an alternating current supply source for energizing said motor, a dynamic braking circuit for said motor including a source of direct current for energizing said stator windings, a switch operating lever movable between a motor stopping position and a motor running position, a relay energized on movement of said lever to motor running position, said relay being operable when energized to connect said supply source and said motor and being operable when deenergized to connect said direct current source with said stator windings to effect dynamic braking, a holding circuit for said relay, and switching means driven by and operable in timed relation with said machine for periodically opening said holding circuit, whereby on return of said switch operating lever to stopping position and opening of said holding circuit by said switching means, said motor is disconnected from said supply source and dynamically braked.

2. In a motor control system, the combination with an alternating current motor for driving a machine, said motor having stator windings, of an alternating current supply source for energizing said motor, a dynamic braking circuit for said motor including a source of direct current for energizing said stator windings, a switch operating lever movable between a motor stopping position and a motor running position, a relay energized on movement of said lever to motor running position, said relay being operable when energized to connect said supply source and said motor and being operable when de-energized to connect said direct current source with said stator windings to effect dynamic braking, a holding circuit for said relay, and switching means driven by and operable in timed relation with said machine for periodically opening said holding circuit, whereby on return of said switch operating lever to stopping position and opening of said holding circuit by said switching means, said motor is disconnected from said supply source and dynamically braked, and a circuit completed on movement of said switch operating lever away from said stopping position and prior to energization of said relay for delivering current from said supply source to said motor while said stator windings are energized by direct current, whereby said machine may be started slowly.

3. In a control system for a conveyor adapted to move a succession of articles in spaced relation in a predetermined path, the combination with an electric motor for driving the conveyor, of a supply source for energizing said motor, a dynamic braking circuit for said motor, a switch operating lever movable between a motor stopping position and a motor running position, a relay energized on movement of said lever to motor running position, said relay being operable when energized to connect said supply source and said motor and being operable when de-energized to render said dynamic braking circuit operable, a holding circuit for said relay, and switching means driven by and operable in timed relation with said conveyor for periodically opening said holding circuit, whereby on return of said switch operating lever to stopping position and opening of said holding circuit by said switching means, said motor is disconnected from said supply source and dynamically braked to stop said conveyor only when the conveyed articles occupy a predetermined position.

VALENTINE PEARCE HARVEY.
GORDON FRANCIS WELLINGTON POWELL.

REFERENCES CITED

The following references are of record in the file of this patent:

UNITED STATES PATENTS

| Number | Name | Date |
| --- | --- | --- |
| 1,584,703 | Penney | May 11, 1926 |
| 1,729,907 | Wensley | Oct. 1, 1929 |
| 1,860,499 | Furnas et al. | May 31, 1932 |
| 1,945,392 | Borden | Jan. 30, 1934 |